US006185097B1

(12) United States Patent
Behl

(10) Patent No.: US 6,185,097 B1
(45) **Date of Patent: *Feb. 6, 2001**

(54) CONVECTIVELY COOLED MEMORY STORAGE DEVICE HOUSING

(75) Inventor: Sunny Behl, San Jose, CA (US)

(73) Assignee: Inclose Design, Inc., CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/926,874

(22) Filed: Sep. 10, 1997

(51) Int. Cl.[7] .................................................. H05K 7/20

(52) U.S. Cl. ......................... 361/695; 361/818; 454/184

(58) Field of Search ...................... 165/80.33, 122–126; 454/184; 361/687, 694, 695, 697, 717–719, 816, 818

(56) References Cited

U.S. PATENT DOCUMENTS

| | | | |
|---|---|---|---|
| 4,751,872 * | 6/1988 | Lawson, Jr. . | |
| 4,926,291 * | 5/1990 | Sarraf . | |
| 5,121,291 | 6/1992 | Cope et al. | 361/384 |
| 5,171,183 | 12/1992 | Pollard et al. | 454/184 |
| 5,173,819 | 12/1992 | Takahashi et al. | 360/97.03 |
| 5,287,009 | 2/1994 | Heung | 307/141 |
| 5,414,591 | 5/1995 | Kimura et al. | 361/695 |
| 5,438,226 | 8/1995 | Kuchta | 307/125 |
| 5,493,457 | 2/1996 | Kawamura et al. | 369/75.1 |
| 5,511,055 | 4/1996 | Otsuki et al. | 369/75.1 |
| 5,547,272 | 8/1996 | Paterson | 312/223.2 |
| 5,596,483 * | 1/1997 | Wyler . | |
| 5,673,029 | 9/1997 | Behl et al. | 340/635 |
| 5,707,282 * | 1/1998 | Clements . | |
| 5,808,867 * | 9/1998 | Wang . | |
| 5,828,549 * | 10/1998 | Gandre . | |
| 5,831,822 * | 11/1998 | Hulick . | |
| 5,838,542 * | 11/1998 | Nelson . | |
| 5,870,247 * | 2/1999 | Schirle | 360/97.02 |
| 5,927,386 | 7/1999 | Lin | 165/80.3 |

FOREIGN PATENT DOCUMENTS 295 19 526 U1 7/1996 (DE) .

OTHER PUBLICATIONS

Winotek's Safety Cooler, http://winotek.com/products/fans/safetycool.html Publication date unknown.

* cited by examiner

*Primary Examiner*—Gerald Tolin
(74) *Attorney, Agent, or Firm*—Burns, Doane, Swecker & Mathis, LLP

(57) ABSTRACT

A memory storage device cooler includes a frame, a fan and a electromagnetic interference shield (EMI shield). The fan and the EMI shield attach to the frame. The frame mounts on a memory storage device so that during operation, the fan cools the memory storage device and the EMI shield shields electromagnetic interference. The EMI shield is made from a magnetically conductive material such as metal or a magnetically conductive polymer.

11 Claims, 9 Drawing Sheets

16 28 116 102 100 94 26 100 116 102 94 14

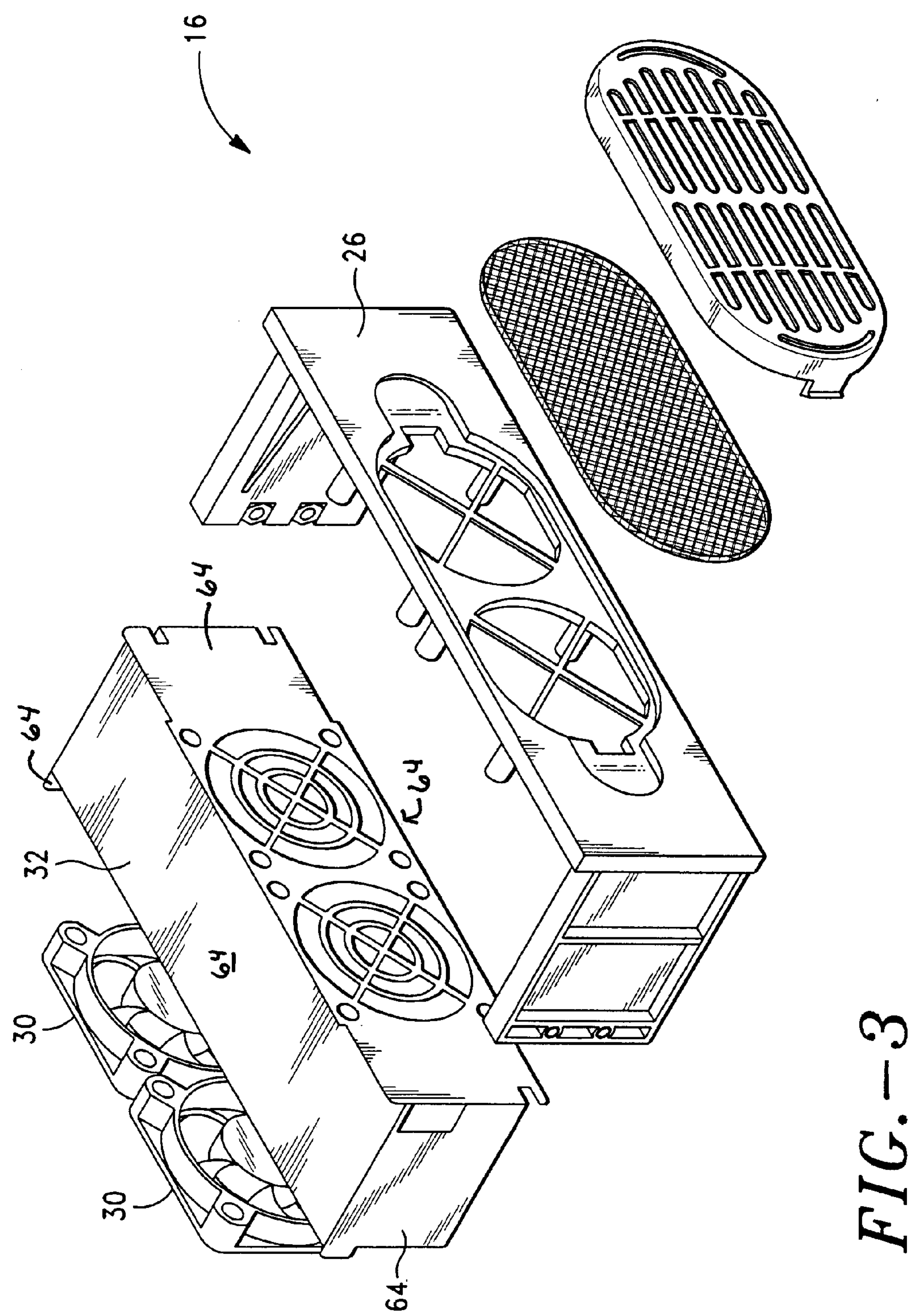
FIG.—3

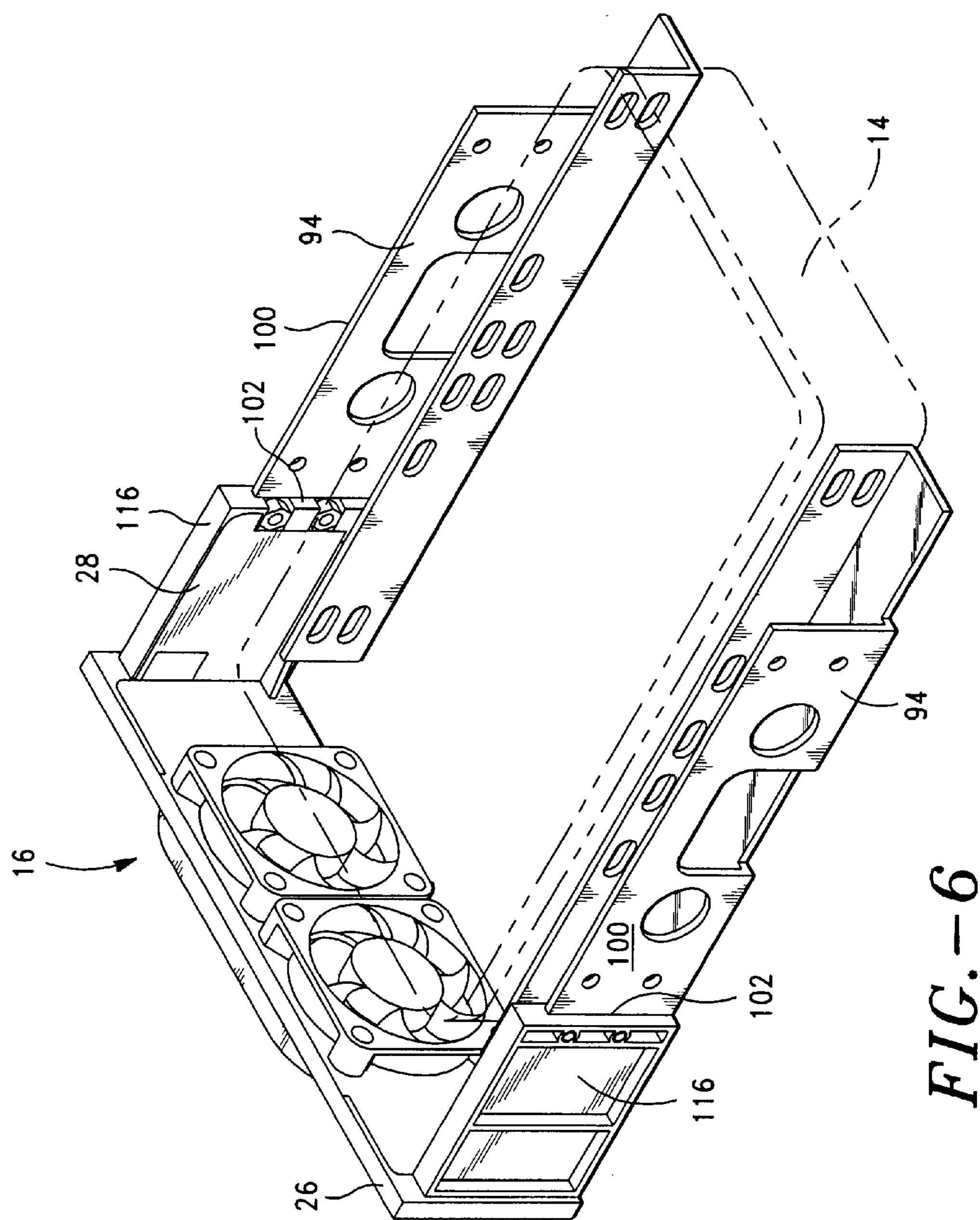
FIG.—6

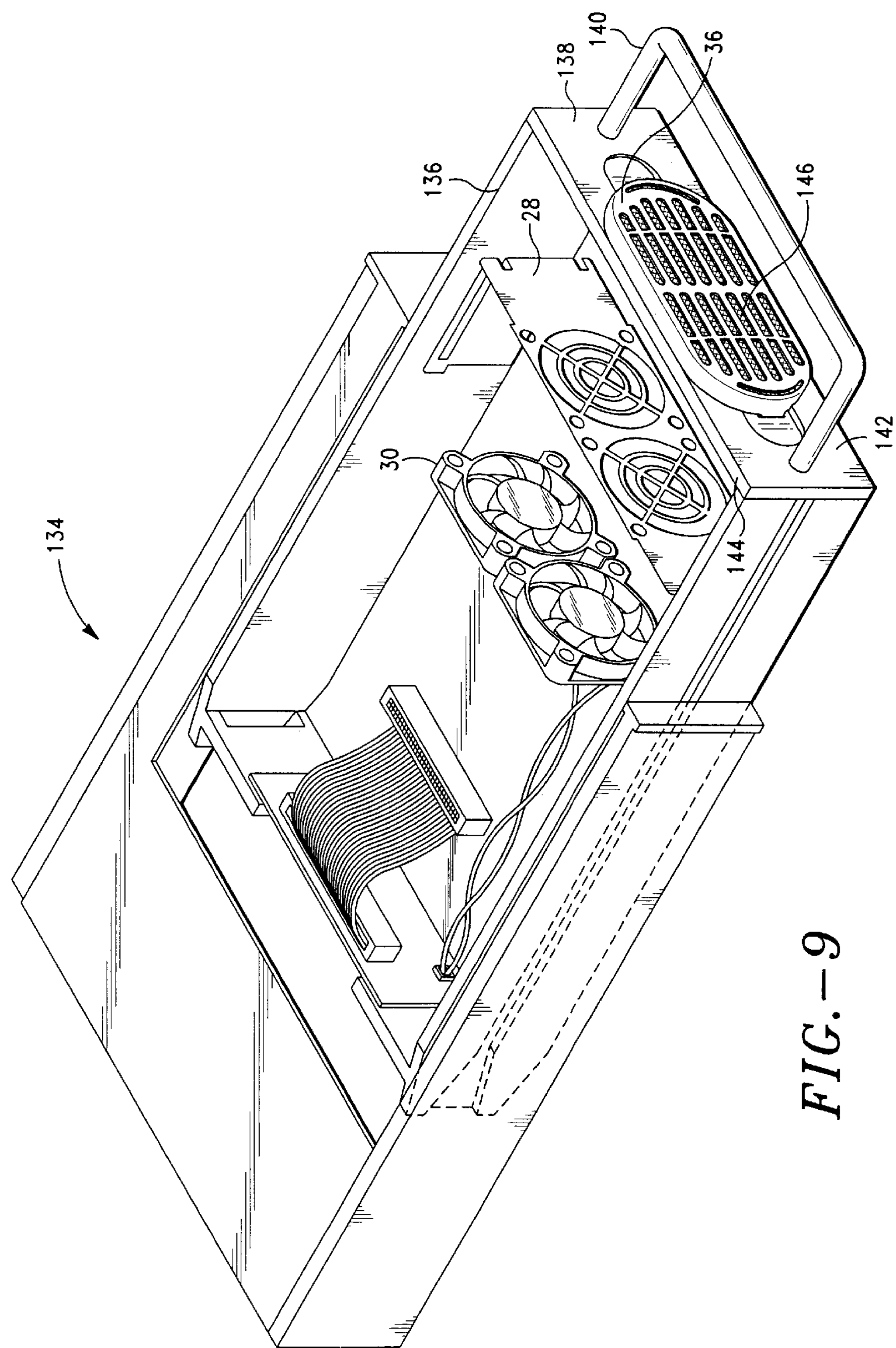
FIG.—9

CONVECTIVELY COOLED MEMORY STORAGE DEVICE HOUSING

BACKGROUND OF THE INVENTION

1. Cross-reference to Related Application

This patent application relates in subject matter to commonly assigned U.S. Pat. No. 5,673,0291, the disclosure of which is incorporated herein by reference.

2. Field of the Invention

The present invention pertains to memory storage device cooling systems, and more particularly to memory storage device coolers having EMI shielding.

3. Previous Art

Housings have evolved to cool enclosed electrical components. A typical memory storage device cooler mounts on the housing, adjacent a memory storage device such as hard disk drive. The typical cooler includes a fan and relies on convective air flow to cool hard disk drives. An example of a memory storage device cooler is disclosed in commonly assigned U.S. Pat. No. 5,673,029, the disclosure of which is incorporated herein by reference.

SUMMARY OF THE INVENTION

The present invention includes a memory storage device assembly for cooling a memory storage device such as a hard disk drive. The assembly includes a memory storage device, fins, a frame and at least one fan. The fins and frame attach to the memory storage device. The fan attaches to the frame for blowing air over the fins to cool the hard disk drive.

According to one aspect of the invention, the assembly is integrated within a memory storage device bay of a memory storage device housing. According to this aspect of the invention, the frame attaches to the housing and holds the fan in the memory storage device bay.

BRIEF DESCRIPTION OF THE DRAWINGS

For a further understanding of the advantages of the present invention, reference should be had to the following detailed description taken in conjunction with the accompanying drawing, in which like parts are given like reference numerals and wherein:

FIG. 3 is an exploded perspective view of a memory storage device cooler and a variation of an EMI shield in accordance with the present invention.

FIG. 6 is a rear perspective view of memory storage device cooler with mounting rails.

FIG. 9 is a perspective view of a housing and a swappable memory storage device carrier in accordance with the present invention.

DETAILED DESCRIPTION OF THE INVENTION

Figure 1:
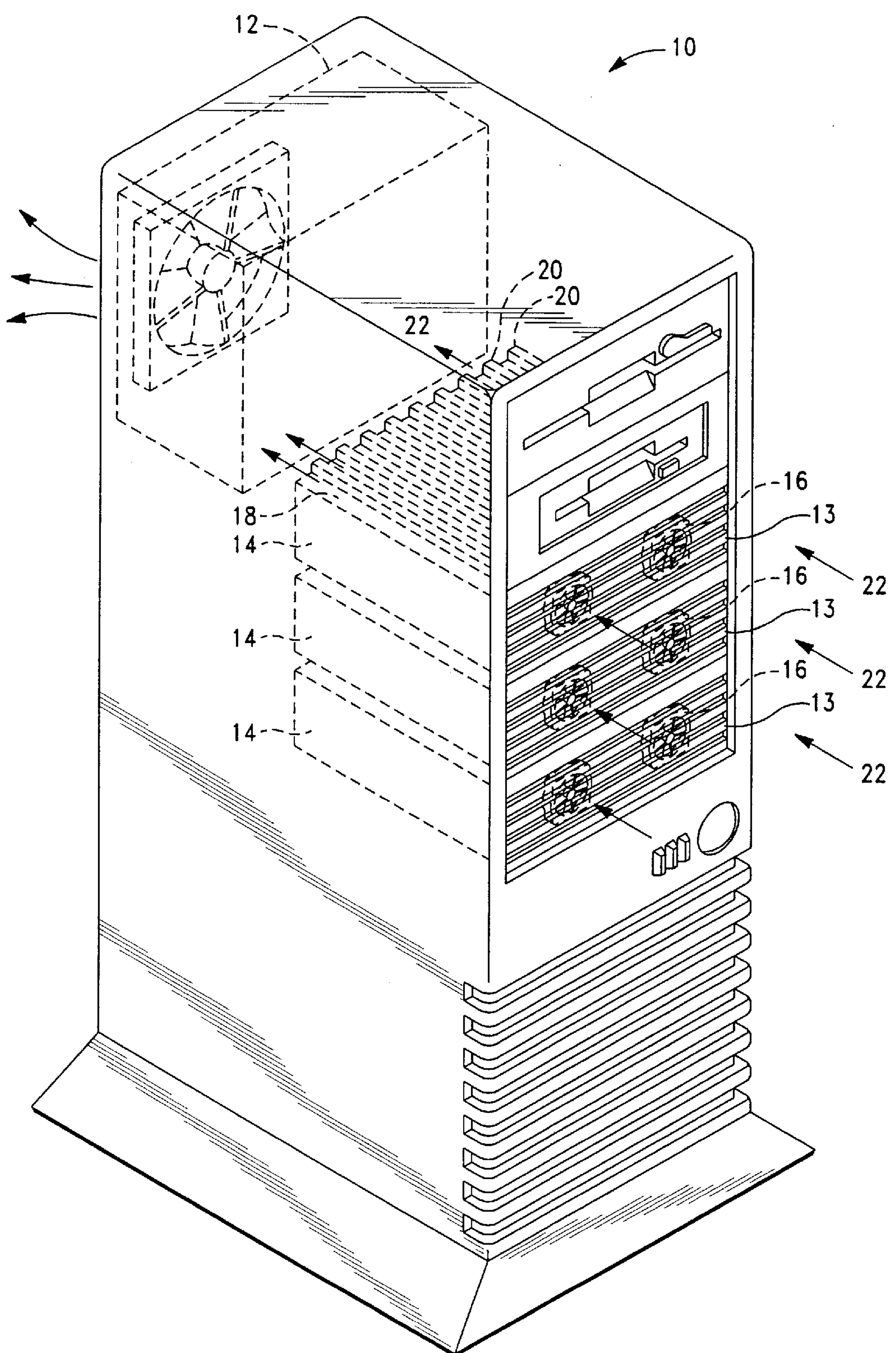
FIG. 1 is a perspective view of the present invention in a memory storage device housing.

FIG. 1 shows a computer including a memory storage device housing generally designated with the reference numeral 10. The memory storage device housing 10 includes a power supply 12, multiple memory storage device bays 13, multiple memory storage devices 14, and memory storage device coolers 16. The power supply 12 powers memory storage devices 14 and the memory storage device coolers 16.

The memory storage device coolers 16 attach within the memory storage device bays 13 to cover the bays 13 and to blow air across the memory storage devices 14 to convectively cool the memory storage devices 14.

Each memory storage device 14 has a surface 18. Each surface 18 is textured to optimize convective cooling. According to one aspect of the invention, each surface 18 includes fins 20. The fins 20 align with airflow from the memory storage device coolers 16. The airflow is in the direction of the arrows 22.

Figure 2:
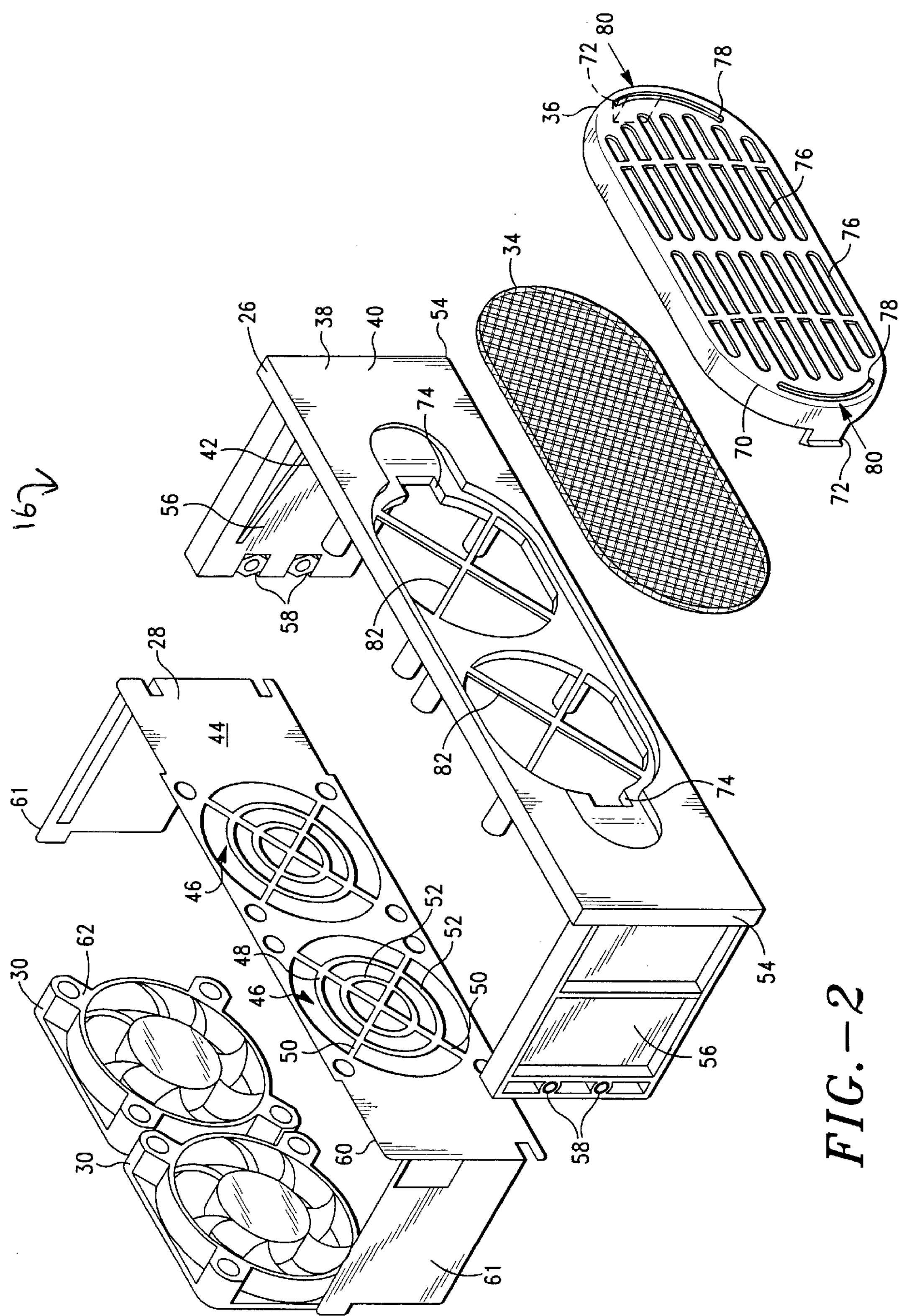
FIG. 2 is an exploded perspective view a memory storage device cooler and an EMI shield in accordance with the present invention.

FIG. 2 shows the memory storage device cooler generally designated with the reference numeral 16. The memory storage device cooler 16 includes a frame 26 and an electromagnetic interference (EMI) shield 28, a pair of fans 30, an air filter 34 and a cover 36 which attach to the frame 26.

The frame 26 has face 38 with a front 40 and a back 42. The EMI shield 28 covers a portion of the back 42 to shield EMI which may escape, or enter the housing though the frame 26. The EMI shield 28 is fabricated from a magnetically conductive material. According to one aspect of the invention, the shield 28 is fabricated from steel sheet metal. According to other aspects of the invention, the shield 28 is fabricated from a material selected from the following: magnetically conductive polymer, aluminum, metal mesh, and honeycombed layers of metal. According to another aspect of the invention, the shield 28 can be fabricated from a non-conductive material and coated with a magnetically conductive material.

The EMI shield 28 is fabricated as a discrete component which conforms in shape to the frame 26 and reinforces the frame 26. The EMI shield 28 includes a face 44 having a vent 46. The vent 46 enables air flow through the EMI shield 28. The face 44 of the EMI shield 28 attaches to the frame 26.

The face 44 of the EMI shield 28 includes a protective grill 48 extending across the vent 46. The grill 48 has a pair of cross members 50. The cross members 50 align perpendicularly with respect to each other. A pair of circular members 52 reinforce the cross members 50. The circular members 52 are sheet metal arcs which and concentrically align with respect to each other. Accordingly, the grill 48 protects the fans 30 and inhibits electromagnetic interference though the frame 26. The frame 26 also includes cross members 82 which separate the air filter 34 from the fans 30. The cross members 82 parallel the cross members 50 to minimize air flow obstruction.

The frame 26 includes two ends 54 and a pair of mounts 56. The mounts 56 extend perpendicularly from each end 54.

The mounts 56 include fasteners 58 which attach the memory storage device cooler 16 to a memory storage device housing 10 (FIG. 1). It can be appreciated, however, that the mounts 56 may be adapted to attach directly to a memory storage device.

The fan 30 and the EMI shield 28 attach to the face 38 so that the EMI shield 28 surrounds the fan 30 on three sides. The EMI shield 28 has three flat sides including a back side 60 and two other sides 61. The fan 30 has a side 62 which presses against the back side 60 of the EMI shield 28. The back side 60 and the two other sides 61 of the EMI shield 28 surround the fan 30 on three sides. It can be appreciated that this example of an EMI shield configuration is but one of the many possible configurations which shield EMI in accordance with the present invention.

The cover 36 has a periphery 70 and a pair of attachment devices 72 extending from the periphery 70 on opposing sides of the cover 36. The frame 26 includes detents 74 for receiving the attachment devices 72. The attachment devices 72 snap the cover 36 to the frame 26. The cover 36 includes vents 76. The periphery 70 is oval shaped and has at least a pair of slots 78 aligned within the periphery 70, adjacent the attachment devices 72. The slots 78 enable radially inward pressure against the periphery 70 near the slots 78, in the direction of the arrows 80, to flex the periphery 70 radially inwards and thereby release the attachment devices 72 from the frame 26. Releasing the attachment devices 72 enables removal of the cover 36 and the air filter 34 so that the air filter 34 can be cleaned.

According to another aspect of the invention, the EMI shield is fabricated integrally with the frame 26. In a variation of this inventive aspect, the frame 26 is be fabricated from a magnetically conductive material and shields EMI. In another aspect of the invention, the filter 34 shields EMI. In still another aspect of the invention, the cover 36 shields EMI. In any case, electromagnetic flux communicated through the frame 26 is minimized.

FIG. 3 shows a memory storage device cooler 16 including a frame 26, fans and an EMI shield 32. The EMI shield is box shaped, having five flat sides 64. The EMI shield 32 surrounds the fans 30.

Figure 5:
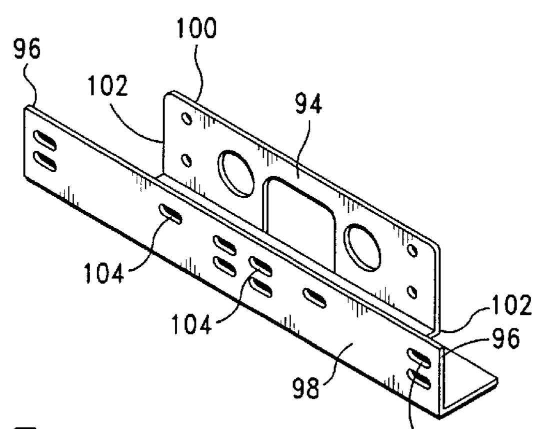
FIG. 5 is a mounting rail in accordance with the present invention.

FIG. 5 shows a mounting rail 94 in accordance with the present invention. The mounting rail 94 includes two ends 96, a first mounting face 98 for attachment to a memory storage device and a second mounting face 100 for attachment to a memory storage device housing.

The second mounting face 98 being relatively shorter than the first mounting face 98 to form an indenture 102 at each end 96. Each indenture 102 is configured to mate with the frame 26 (FIG. 2) of a memory storage device cooler 16 (FIG. 2).

The indentures 102 at both ends 96 of the mounting rail 94 enable the rail to be reversible and interchangeable. The mounting rail 94 is capable of attachment to either side of a memory storage device to mount the memory storage device within a memory storage device housing. Mounting rail interchangeability lowers production costs and eases installation.

Mounting face 98 includes mounting openings 104 aligned with the three mounting tool openings on the mounting face 100. Additional openings 104 align with each indenture 102 because the indentures enable mounting tool access to the respective mounting tool openings 104.

FIG. 6 shows a memory storage device cooler 16 having a frame 26, mounting rails 94 and an EMI shield 28. The frame 26 includes a pair of mounts 116. The mounts 116 mate with the mounting rails 94. The mounting rails 94, in turn, attach to the memory storage device 14. The indenture 102 of the each rail 94 aligns with the mounts 116 of the frame 26. The mounting face 100 of the each rail 94 parallels the respective frame mount 116. Accordingly, the rails 94 align and support the memory storage device cooler 16 during frame 26 installation.

The frame 26 and the rails 94 are each independently attachable to the housing 10 (FIG. 1). Independent attachment enables selective removal of the memory storage device cooler 16 and the memory storage device 14 from the housing.

Figure 7:
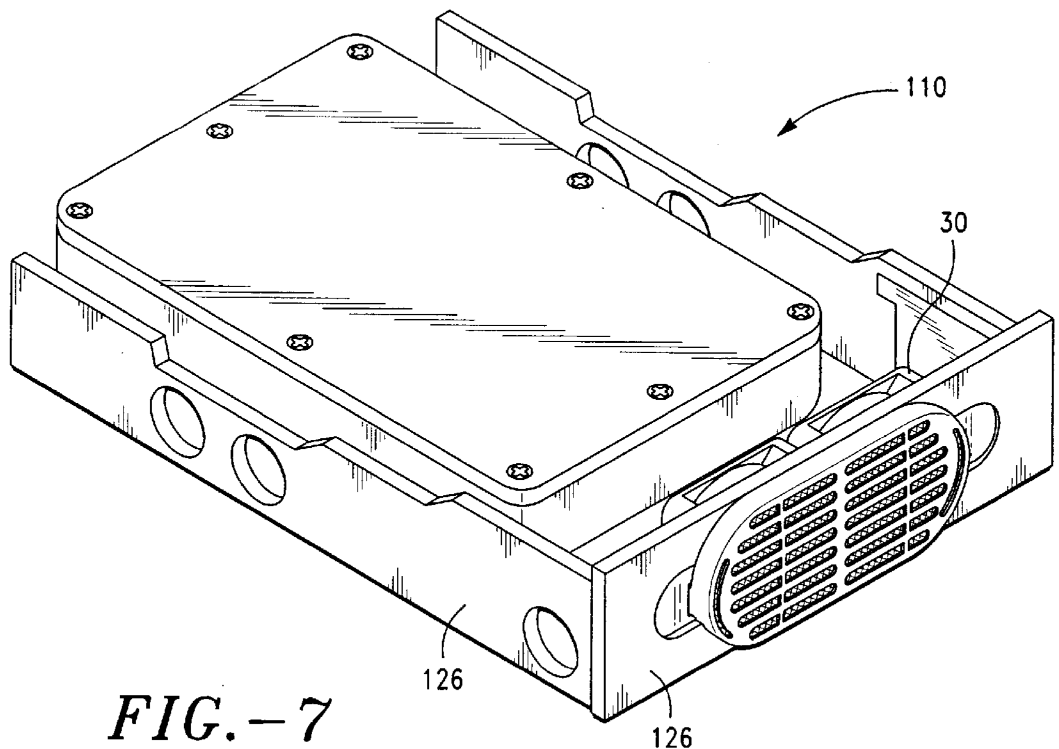
FIG. 7 is a perspective view an embodiment a memory storage device cooler having integrated mounting rails accordance with the present invention.
Figure 4:
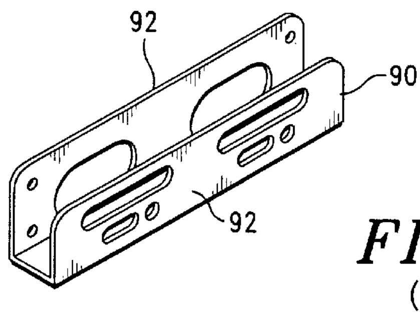
FIG. 4 is a known mounting rail.

FIG. 7 shows a memory storage device cooler 110 having fans 30 and a frame 126. The frame 126 is a single unit. In this embodiment, the frame 126 is an injection molded plastic, fabricated from a magnetically conductive polymer. Preferably, the polymer has a magnetic permeability of greater than 75 times the magnetic permeability of air at standard temperature and pressure.

Figure 8:
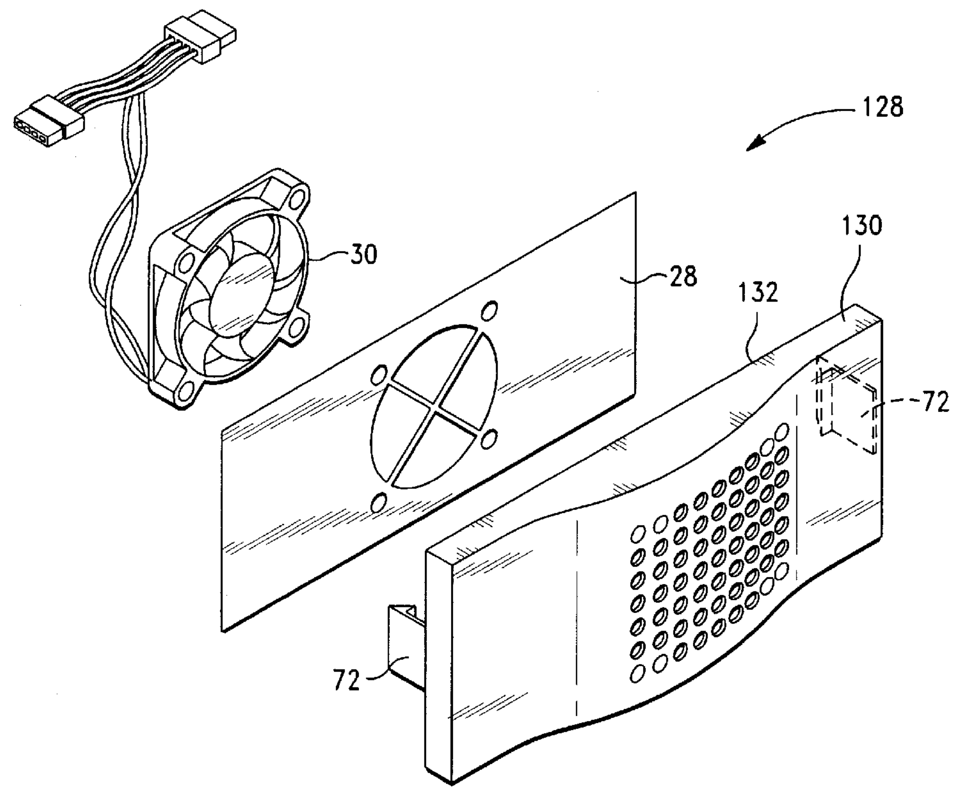
FIG. 8 is an exploded perspective view of an embodiment of a memory storage device cooler in accordance with the present invention.

FIG. 8 shows a cooler 128 including a frame 130, an EMI shield 28 and a fan 30. The frame 130 has a back 132. The fan 30 and the EMI shield 28 attach to the back 132 of the frame 130.

The back of the frame 130 has attachment devices 72 which snap to a memory storage device housing. Accordingly, the memory storage device cooler 128 is useful for covering a memory storage device bay. Additionally, the memory storage device cooler 128 is useful for introducing air into any housing, including those which do not hold memory storage devices.

This cooler 128 is useful for cooling a work station computer housing, which is on a network and does not include a hard drive. RAID system housings, or other electronic equipment housings can also use the cooler 128.

FIG. 9 shows a memory storage device housing generally designated 134 and a memory storage device carrier 136. The carrier 136 is configured for holding a memory storage device and sliding the memory storage device into the housing 134. Such housing and carrier combinations are particularly useful in systems having numerous memory storage devices. In a RAID system, for example, the housing 134 in combination with the carrier 136 enable hot swapping of hard drives.

The carrier 136 includes a frame 138, a handle 140, a cover 36, an EMI shield 28 and a pair of fans 30. The frame 138 defines a front 142, a back 144 and a vent 146 for allowing airflow through the frame 138. The handle 140 mounts on the front 142 of the frame 138. The cover 36 mounts over the vent 146. The EMI shield 28 and the fans 30 attach to the back 144 of the frame 138.

Figure 10:
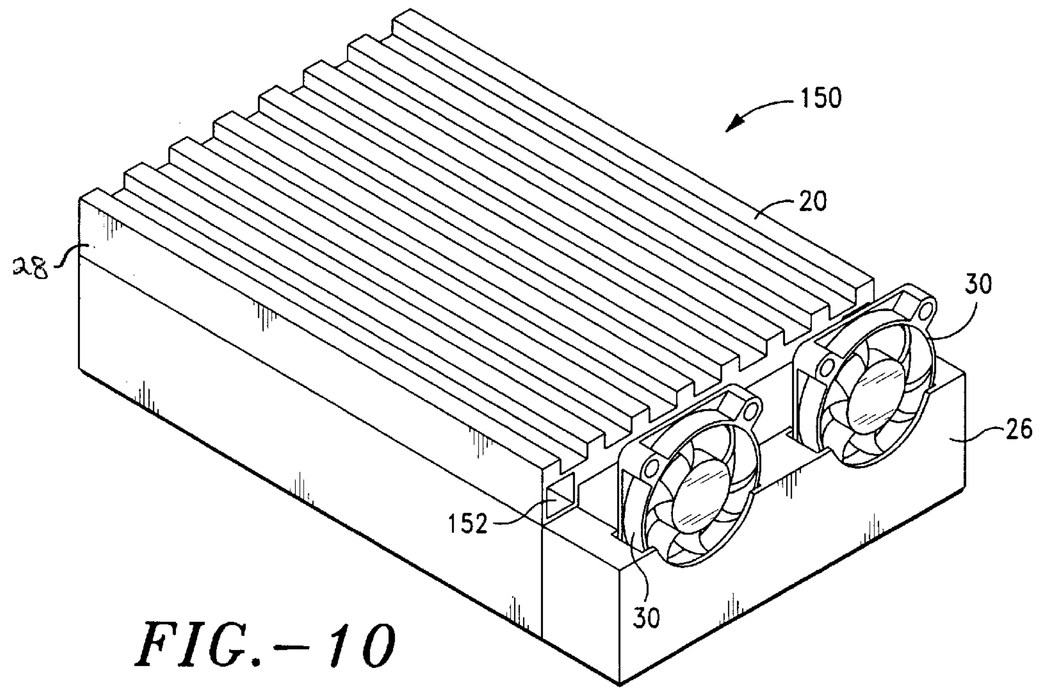
FIG. 10 is a perspective view of a memory storage device in accordance with the present invention.

FIG. 10 shows a memory storage device generally designated with a reference numeral 150. The memory storage device includes fans 30; a frame 26 which shields EMI and cooling fins 20. The frame 26 is metallic and covers a portion of the fans 30 to function as an EMI shield 28.

The memory storage device 150 defines an air conduit 152 aligned to receive air flow from at least one fan 30. The fan 30 blows air over the memory storage device 150, along the fins 20 and through the air conduit 152 to optimize convective cooling of the memory storage device 150.

It can be appreciated that a housing for holding the memory storage device 150 includes multiple memory storage device bays with covers. The covers may be configured for shielding EMI. Accordingly, the frame and the cover cooperate to shield EMI.

Figure 11:
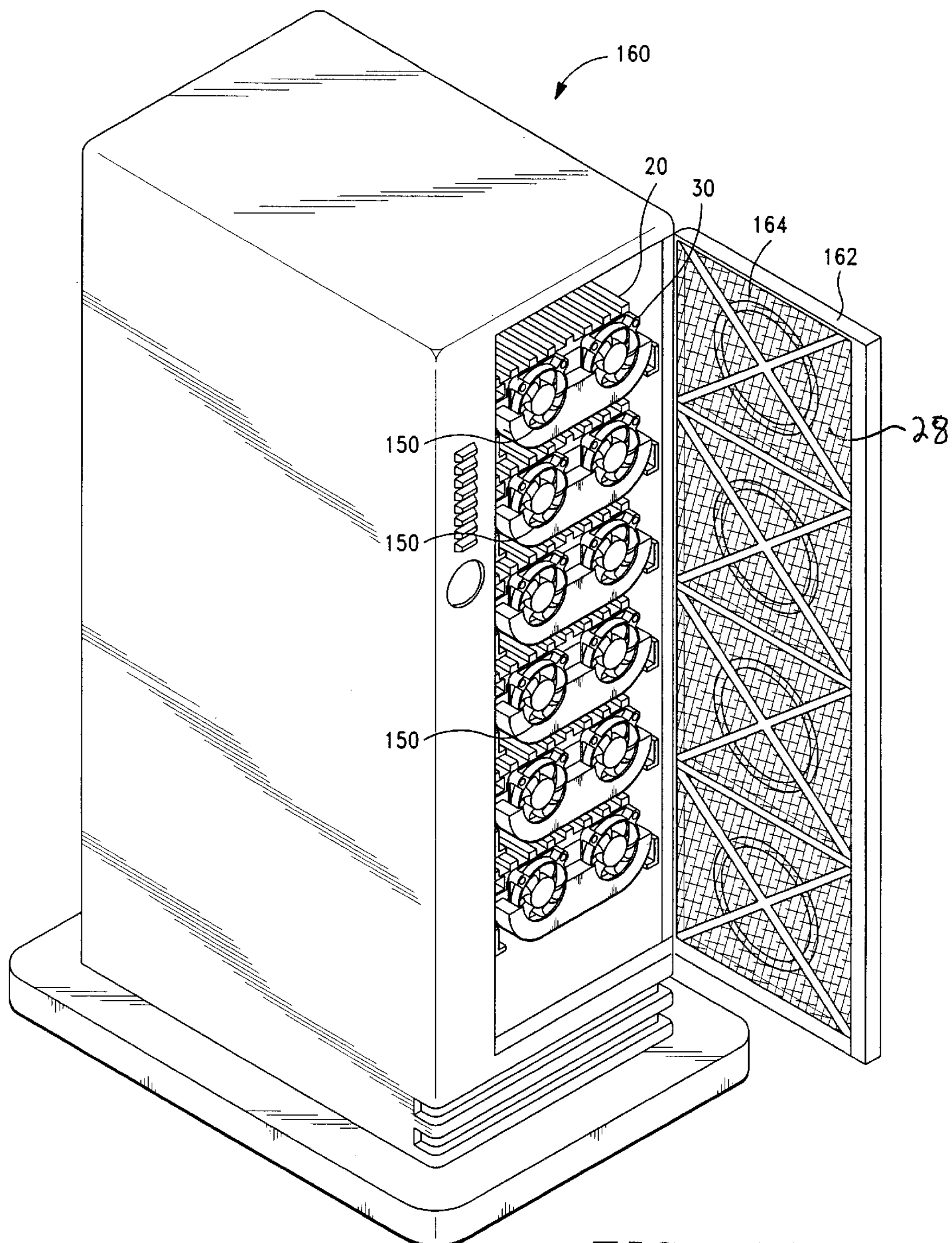
FIG. 11 is a perspective view of a RAID system including a memory storage device housing in accordance with the present invention.

FIG. 11 shows a memory storage device housing generally designated with the reference numeral 160. The housing 160 holds memory storage devices 150. The housing 160 includes a vented cover 162 having an air filter 164, and an EMI shield 28.

The air filter 164 functions to shield EMI. The filter 164 is fabricated from a metal mesh. In one embodiment, the metal mesh includes a layered aluminum screen. In another embodiment, the metal mesh includes honeycombed layers of a metal. In another embodiment, the filter includes a viscous impingement coating consisting of a water soluble film of hydrocarbon oil. Preferably, the air filter is a TECKAIRE®, TECKCELL™, or TECKSCREEN™ air filter. The filter 164 enables air to pass and shields EMI.

The memory storage devices 150 are stacked closely. According to one aspect of this invention, the memory storage devices 150 are stacked closely enough to touch. The fins 20 and fans 30 cooperate to force air flow between the memory storage devices to cool the memory storage devices 150.

Figure 12:
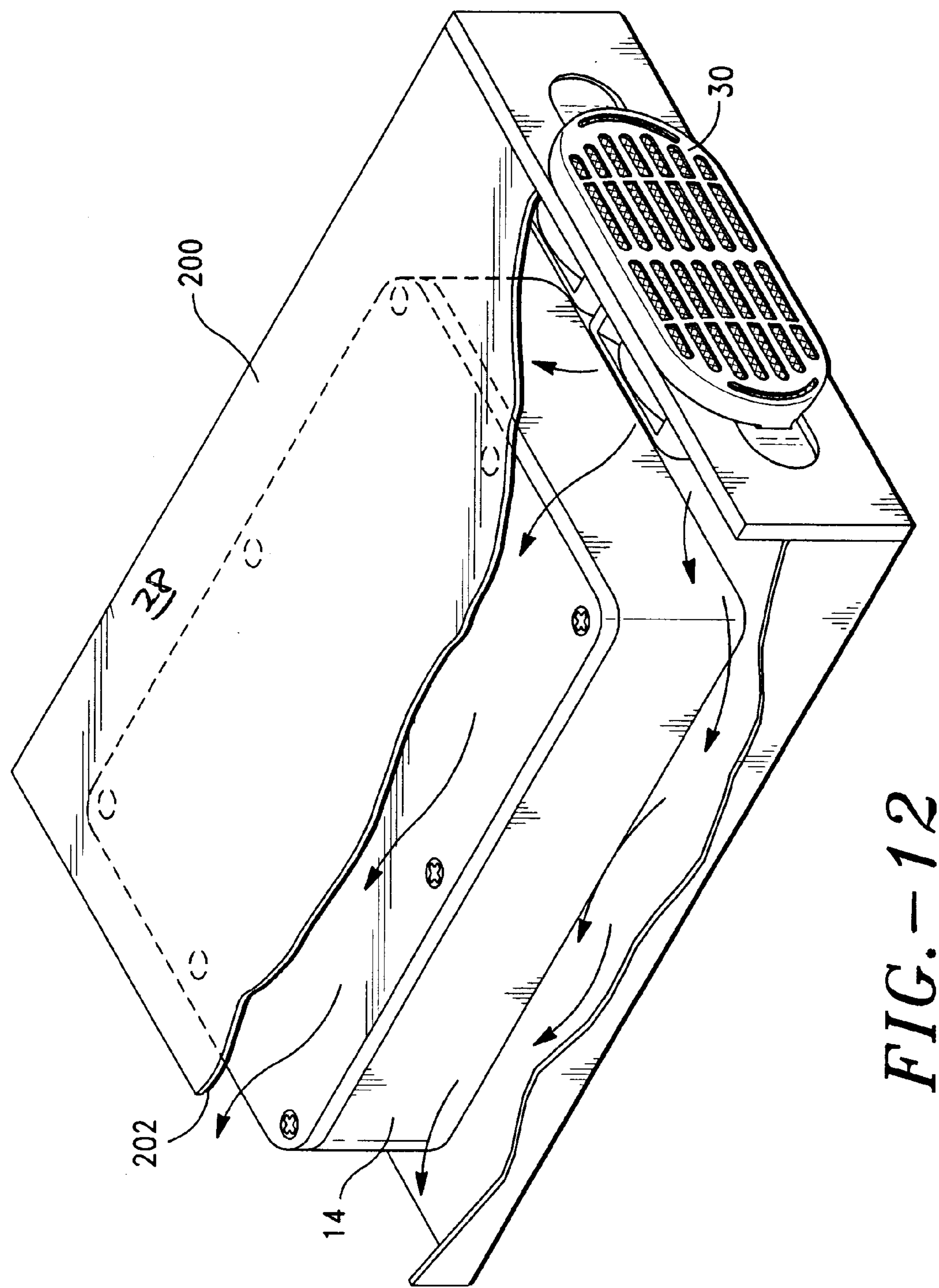
FIG. 12 is a perspective view of an EMI shield which encloses a memory storage device.

FIG. 12 is a perspective view of an EMI shield 200 enclosing a memory storage device 14. The shield 200 forms a tunnel, in which, the memory storage device 14 mounts. The fan 30 attaches to the memory storage device 14 on one side of the tunnel. The EMI shield 200 has an opening 202 at one end of the tunnel which opposes the fan 30. Accordingly, the EMI shield 200 operates as a conduit to direct air from the fan 30 along the exterior of the memory storage device 14 so that multiple memory storage devices can be closely stacked without overheating.

While the foregoing detailed description has described various embodiments of the invention it is to be understood that the above description is illustrative only and not limiting of the disclosed invention. Particularly, the specific details of the geometry of the EMI shield 28 may be altered to any suitable configuration. Accordingly, the invention is to be limited only by the claims.

What is claimed is:

1. A memory storage device heat sink and fan assembly mountable in a memory storage device bay for cooling a hard disk drive with air from outside the bay, comprising:

a hard disk drive;

fins attached to the hard disk drive;

a frame attached to the hard disk drive for holding a fan;

the frame has two ends, each end including a mount, the mounts extend from the ends of the frame, the mounts attach to the hard disk drive; and a fan attached to the frame for blowing outside air over the fins to cool the hard disk drive;

the frame includes an air filter and an air filter cover attached to the frame, the air filter filters the outside air and the cover holds the air filter on the frame.

2. A memory storage device housing as set forth in claim 1 further comprising mounting rails, the mounts mate with the mounting rails to enable the frame to attach the hard disk drive to the memory storage device bay.

3. A memory storage device housing for enabling a hard disk drive to be convectively cooled with outside air comprising:

a housing having a memory storage device bay and a vented cover, the vented cover has an interior side and an exterior side;

a hard disk drive mounted in the memory storage device bay;

fins attached to the hard disk drive to facilitate convective cooling of the hard disk drive;

a frame attached to the housing;

the frame has two ends each end including a mount, attached to the hard disk drive the mounts extend perpendicularly from the ends of the frame, the mounts attach to the housing to hold the frame in the memory storage device bay; and a fan attached to the frame on the interior side of the vented cover for drawing the outside air through the vented cover and blowing the air over the fins to cool the hard disk drive.

4. A memory storage device housing as set forth in claim 3, wherein the frame includes a pair of rails to mount the hard drive in the bay.

5. A memory storage device housing as set forth in claim 3, wherein the vented cover hinges from the memory storage device housing to cover the bay.

6. A memory storage device housing as set forth in claim 3, wherein the vented cover includes an air filter.

7. A memory storage device housing as set forth in claim 3, wherein the housing has multiple memory storage device bays and the vented cover hinges to the housing to removeably cover the memory storage device bays.

8. A memory storage device housing as set forth in claim 7, wherein the air filter includes a metal mesh to shield EMI.

9. A memory storage device housing for enabling a hard disk drive to be convectively cooled with outside air comprising:

a housing having a memory storage device bay and a vented cover having an interior side and an exterior side;

a frame attached to the memory storage device bay for holding a fan on the interior side of the vented cover, the frame having cooling fins;

the frame has two ends, each end including a mount, the mounts extend from the ends of the frame, a hard disk drive attached to the mounts; and a fan attached to the frame for blowing the outside air through the vented cover and over the fins to cool the hard disk drive.

10. A housing as set forth in claim 9, wherein the vented cover includes an air filter.

11. A housing as set forth in claim 10, wherein the frame holds the fan adjacent the vented cover to optimize air flow to the fins.

* * * * *